(12) United States Patent
Nguyen et al.

(10) Patent No.: US 9,342,414 B1
(45) Date of Patent: May 17, 2016

(54) RESERVE POWER BUS RING FOR DATA CENTER

(71) Applicant: Amazon Technologies, Inc., Reno, NV (US)

(72) Inventors: Huyen Van Nguyen, Bothell, WA (US); Kelsey Michelle Wildstone, Seattle, WA (US); Paul Andrew Churnock, Vashon, WA (US); Matthew David Striffler, Papillion, NE (US)

(73) Assignee: Amazon Technologies, Inc., Reno, NV (US)

( * ) Notice: Subject to any disclaimer, the term of this patent is extended or adjusted under 35 U.S.C. 154(b) by 127 days.

(21) Appl. No.: 14/179,392

(22) Filed: Feb. 12, 2014

(51) Int. Cl.
*G06F 11/00* (2006.01)
*G06F 11/20* (2006.01)
*G06F 11/30* (2006.01)

(52) U.S. Cl.
CPC ........ *G06F 11/2015* (2013.01); *G06F 11/3062* (2013.01)

(58) Field of Classification Search
CPC ... G06F 1/30; G06F 11/2015; G06F 11/3058; G06F 11/3062
See application file for complete search history.

(56) References Cited

U.S. PATENT DOCUMENTS

| | | | |
|---|---|---|---|
| 6,000,042 A * | 12/1999 | Henrie | 714/40 |
| 6,967,487 B2 * | 11/2005 | Garnett | 324/537 |
| 7,459,803 B2 | 12/2008 | Mosman | |
| 7,586,211 B2 * | 9/2009 | Loffink et al. | 307/64 |
| 8,200,990 B2 * | 6/2012 | Dishman et al. | 713/300 |
| 2010/0064150 A1 * | 3/2010 | Higuchi | 713/300 |
| 2014/0157008 A1 * | 6/2014 | Ammu et al. | 713/300 |
| 2014/0208129 A1 * | 7/2014 | Morales et al. | 713/300 |
| 2014/0208130 A1 * | 7/2014 | Morales et al. | 713/300 |

OTHER PUBLICATIONS

ABB, "Is-Limiter, The World Fastest Limiting and Switching Device", 2013, pp. 1-20.
Morpac Industries, "Electrical Switch Definitions", downloaded Nov. 26, 2013, pp. 1-7.
ABB, "Is-Limiter", Oct. 13, 2011, pp. 1-26.

* cited by examiner

*Primary Examiner* — Joseph Kudirka
(74) *Attorney, Agent, or Firm* — Robert C. Kowert; Meyertons, Hood, Kivlin, Kowert & Goetzel, P.C.

(57) ABSTRACT

A reserve power bus ring links multiple reserve power systems to computer systems in a data center. The reserve power bus ring enables multiple reserve power systems to concurrently provide reserve power support to sets of computer systems. The reserve power bus ring includes portions to which one or more reserve power systems and computer systems are coupled, and isolation devices collectively isolate particular portions of the reserve power bus ring in response to a fault condition in that particular portion, such that that computer systems on other portions of the ring continue to receive reserve power support from the reserve power systems coupled to the remaining portions. A reserve power bus ring may include respective power buses coupling two or more reserve power systems on an upstream side and a downstream side, and isolation devices can break a connection of the power bars to isolate the reserve power systems.

20 Claims, 9 Drawing Sheets

RESERVE POWER BUS RING FOR DATA CENTER

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage. A network of cabling, bus bars, power connectors, and power distribution units, is used to deliver the power at the lower voltage to numerous specific components in the facility.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system to ensure uninterrupted power supply for the servers, further increasing maintenance costs.

Some servers are coupled to one or more back-up components and systems via a dedicated power pathway, where the number of pathways coupling one or more servers to the one or more back-up components and systems is limited to a particular pathway. In addition, some back-up components and systems provide back-up power support to multiple servers. In both instances, servers may be vulnerable to loss of back-up power support from various causes, including faults in the dedicated power pathway between the servers and the back-up components and systems and faults in the back-up components and systems themselves. Furthermore, where a set of back-up components and systems provide back-up power support to multiple servers, those multiple servers may lose back-up power support due to one or more various faults related to the back-up components and systems, one or more pathways associated with such components and systems, etc. Furthermore, back-up power support for one or more servers may be lost if one or more back-up components and systems are taken off-line for maintenance. Mitigating such risks may be costly in terms of capital costs and in terms of costs of operation and maintenance (for example, performing additional maintenance on back-up components and systems to mitigate the risk of back-up power support loss due to faults in such components and systems).

Figure 1:
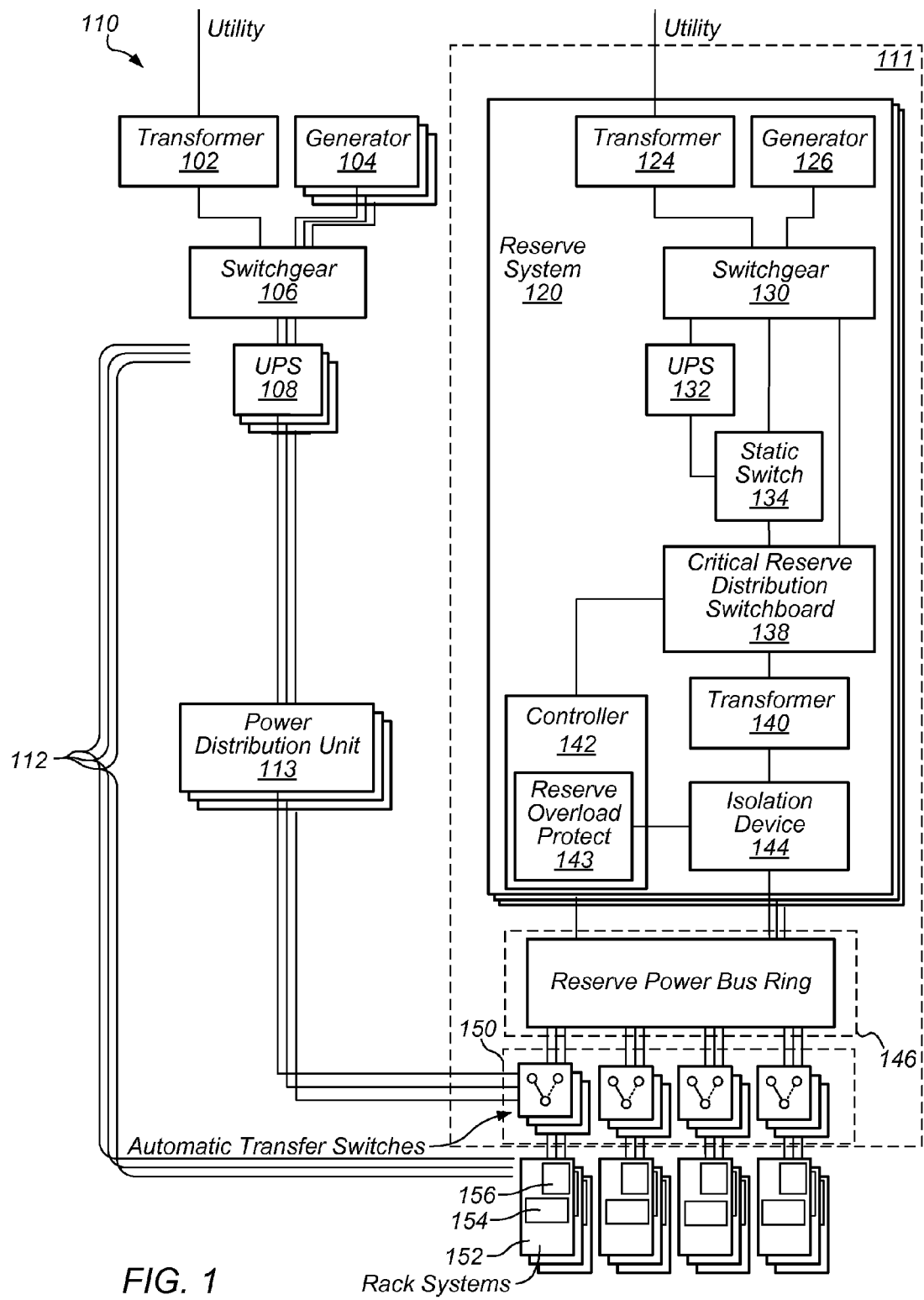
FIG. 1 is a block diagram illustrating one embodiment of a data center having a reserve power system that backs up primary power systems for multiple rooms of a data center via a reserve power bus ring.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a reserve power bus ring for providing reserve power support in a data center are disclosed. According to one embodiment, a system for supplying power includes two or more sets of computer systems; one or more primary power systems, two or more reserve power systems, and a reserve power bus ring coupling the two or more reserve power systems and each of the two or more sets of computer systems. The one or more primary power systems are coupled to, and provide primary power support to at least one of the two or more sets of computer systems. The two or more reserve power systems provide reserve power support to the two or more sets of computer systems. The total power requirements of the two or more sets of computer systems exceed the capacity of each individual reserve power system to supply power. The reserve power bus ring includes sectionalizing switches configured to, in response to detection of a fault condition in a particular portion of the reserve power bus ring, collectively isolate that particular portion from other portions of the reserve power bus ring, such that each of the one or more other sets of computer systems coupled to the other portions continue to receive reserve power support from the other reserve power systems coupled to one of the other portions of the reserve power bus ring.

According to one embodiment, a system for providing reserve power includes a reserve power bus ring communicatively coupling each of two or more sets of computer systems to each of at least two reserve power systems. The reserve power bus ring supplies reserve power from each of the reserve power systems to each of the sets of computer systems. The reserve power bus ring includes at least two parallel power bus bars coupled in series and is partitioned into at least two portions bounded by at least two normally-closed isolation devices. Each of the reserve power systems is coupled to separate portions, and the isolation devices collectively isolate a particular portion of the reserve power bus ring from a remaining portion of the reserve power bus ring in response to detection of a fault condition regarding the particular portion.

According to one embodiment, a method includes monitoring a plurality of portions of a reserve power bus ring for one or more fault conditions and, in response to detection of a fault condition associated with a particular portion of the reserve power bus ring, automatically selectively triggering isolation devices to isolate the particular portion from a remainder of portions of the power ring bus. Each portion of the reserve power bus ring is coupled to at least one set of computer systems and at least one reserve power system, and the reserve power bus ring portions are configured to route power from each of the reserve power systems to each set of computer systems. When the particular portion of the power ring bus is isolated, each set of computer systems coupled to one of the remaining portions continues to receive reserve power support from each reserve power system coupled to at least one of the remaining portions.

In various embodiments, redundant power is provided for many different power distribution systems. In one embodiment, power redundancy is sized such that a system can support any N distribution system failures. In some embodiments, part or all of a reserve power system is oversubscribed to achieve N+1 redundancy for a data center (rather than, for example, 2 N power redundancy). In some embodiments, a system having less than one-to-one redundancy may include overload protection, such as a breaker system, to protect against overload of a reserve power system.

In some embodiments, one or more reserve power systems provide back-up power support ("reserve power support") for systems and components from top to bottom in a power distribution chain. In certain embodiments, a reserve power system backs up a primary power system including a transformer that receives power from a utility feed, a backup generator for the utility feed, a switchboard that receives power from the transformer, one or more UPSs that receive power from the switchboard, and one or more power distribution units.

In some embodiments, a reserve power system provides reserve power support to multiple systems and components that receive primary power support from one or more separate primary power systems. Reserve power can be distributed from a given reserve power system to multiple systems and components to provide reserve power upon demand by one or more of such systems and components. For example, a reserve power output from a reserve power system may be distributed along one or more power bus bars to which multiple electrical loads are coupled, and each load may selectively switch to receiving reserve power from the bus bar based on certain conditions, including loss of, or a fault condition regarding a primary power system supplying primary power support to the load.

In some embodiments, a given reserve power system is coupled to one or more electrical loads whose total ("collective") power requirements exceed the reserve power capacity of that reserve power system. Such a reserve power system is "oversubscribed" with respect to the electrical loads. An oversubscribed reserve power system may be configured to provide reserve power support to only a limited selection of the electrical loads at any given time, such that the required power supply capacity of the reserve power system meets the reduced power requirements of the supported loads at any given time. For example, the reserve power system may be used to provide power to a load during maintenance of some or all of one or more primary power systems supporting that particular load, a limited number of loads that are less than the total number of loads, etc.

In some embodiments, a reserve power bus ring communicatively couples multiple reserve power systems to multiple electrical loads receiving primary power support from one or more separate primary power systems. The reserve power bus ring provides reserve power support redundancy to loads coupled to the ring by enabling multiple reserve power systems to collectively and concurrently provide reserve power support to the loads through the ring. In the event of a fault associated with a particular reserve power system, electrical pathway failure downstream of the reserve power system, etc. that results in a loss of reserve power support provided by that particular reserve power system, one or more electrical loads that previously received reserve power support at least in part from that particular reserve power system may continue to receive reserve power support from one or more other reserve power systems, thereby ensuring uninterrupted reserve power support for the one or more electrical loads.

In some embodiments, some or all of the multiple reserve power systems coupled to a reserve power bus ring have a total ("collectively") capacity to supply power that meets a power requirement of a portion or all of the loads coupled to the reserve power bus ring. Such additional support, in addition to providing for reserve power support redundancy, provides a buffer of power support for each reserve power system, even if the total power support capacity of all of the reserve power systems coupled to the ring remains exceeded by the total power requirements of the all of the loads coupled to the ring. For example, if each reserve power system is oversubscribed to a given "set" of loads on a portion of a reserve power bus ring, reserve power systems coupled to one or more portions of the reserve power bus ring can provide additional reserve power support to the given set of loads, via the reserve power bus ring, to supplement a reserve power support shortfall by that reserve power systems to support the given set of loads.

In some embodiments, a reserve power bus ring comprises multiple segments ("portions") that can each be selectively isolated from the remaining portions of the ring in the event of a fault condition associated with that portion. Each portion may include one or more coupled power bus bars, one or more additional devices, etc. For example, a portion of a reserve power bus ring may include an assembly of two or more power bus bars coupled in series, where one or more isolation devices are coupled to each end of the assembly to form the ring portion. In some embodiments, isolation of one or more portions can be implemented by one or more isolation devices, which can include switching devices, fault current limiter devices, etc., that border each ring portion. A switching device may include a sectionalizing switch that selectively opens or closes to couple or isolate two or more ring portions from each other, respectively. A fault current limiter device may include a device configured to limit a current through an electrical pathway to a certain amount if one or more conditions are met. Examples of one or more conditions can include one or more of a current, voltage, etc. through an electrical pathway passing a predetermined threshold.

In some embodiments, isolating a portion of a reserve power bus ring that is associated with a fault condition enables at least a portion of the reserve power bus ring, which may include the isolated portion, to continue to provide reserve power support redundancy to at least some electrical loads coupled to other ring portions by preventing those loads from being affected by the fault. For example, where a fault condition associated with a particular ring portion is caused by a fault in a reserve power system coupled to that particular ring portion that boosts the current through the particular ring portion beyond a predetermined threshold level, isolating that particular ring portion ensures that the current passing through the remaining ring portions remains within certain levels, ensuring that at least some loads coupled to the remaining portions continue to receive uninterrupted reserve power support. In some embodiments, isolating ring portions may enable loads coupled to the remaining non-isolated ring portions to continue to receive reserve power support from one or more reserve power systems, including reserve power systems coupled to other non-isolated ring portions, even if some loads and reserve power systems are isolated from the rest of the ring. In another example, where a fault condition is caused by a power source to one reserve power system becoming unsynchronized with another power source to another reserve power system, and where the two reserve power systems are coupled to different ring portions, isolating the different ring portions may enable loads coupled to each separate portion to continue to receive reserve power support from reserve power systems coupled to the respective portions. The ring portions may be re-coupled upon one or more conditions, including subsequent absence of a fault condition.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, providing power "support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the load by a transfer switch that is downstream of the reserve power system and upstream of the load, where the transfer switch may selectively route the reserve power feed or a primary power feed to the load based at least in part upon one or more conditions associated with the primary power feed.

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.).

As used herein, "primary power" means any power that can be supplied to an electrical load, for example, during normal operating conditions.

As used herein, "floor power distribution unit" refers to a power distribution unit that can distribute electrical power to various components in a computer room. In certain embodiments, a power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reserve power" means power that can be supplied to an electrical load upon the failure of, or as a substitute for, primary power to the load.

As used herein, "source power" includes power from any source, including but not limited to power received from a utility feed. In certain embodiments, "source power" may be received from the output of another transformer (which is sometimes referred to herein as "intermediate power").

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

FIG. 1 is a block diagram illustrating one embodiment of a data center having a reserve power system that backs up primary power systems for multiple rooms of a data center through a reserve power bus ring. Data center 100 includes rack 152, primary power side 110, and reserve power side 111. Primary power side 110 includes transformer 102, generators 104, switchgear 106, and primary power systems 112. Reserve power side 11 includes reserve power systems 120, power bus ring 146 and automatic transfer switches 150. Sets of computer systems 154 in racks 152 may perform computing operations in data center 100. Computer systems 154 may be, for example, servers in a server room of data center 100. Computer systems 154 in racks 152 may each receive power from one of primary power systems 112. In one embodiment, each of primary power systems 112 corresponds to, and provides power to, the servers in one room in data center 100. In one embodiment, each of primary power systems 112 corresponds to, and provides power to, one rack system in data center 100.

Primary power systems 112 each include UPS 108 and floor power distribution unit 113. Floor power distribution unit 113 provides power to various racks 152. In some embodiments, floor power distribution unit 113 includes a transformer that transforms the voltage from switchgear 106. Each rack 152 may include a rack power distribution unit 156. Rack power distribution units 156 may distribute power to computer systems 154.

Transformer 102 is coupled to a utility feed. The utility feed may be a medium voltage feed. In some embodiments, the utility feed is at a voltage of about 13.5 kilovolts or 12.8 kilovolts at a frequency of about 60 Hz. In some embodiments, transformer 102 has an output of 480 Y/277 volts, three-phase power. Transformer 124 may, in some embodiments, have a similar output. Generators 104 may provide power to primary power systems 112 in the event of a failure of utility power to transformer 102. In one embodiment, one of generators 104 provides back-up power for each of primary power systems 112. In some embodiments, one or more of generators 104 and 126 has an output of 480 Y/277 volts three phase power. In some embodiments, one or more of generators 104, 126 is controlled by a PLC. UPS 108 may provide uninterrupted power to racks 152 in the event of a power failure upstream from UPS 108.

Although the power output in the examples given above is at 480 Y/277 volts, power voltage in primary power side 110 and reserve power side 111 may in various embodiments be at other voltage levels. Power voltage levels in may vary, for example, based on the location of a data center. For example, power voltage levels may vary from one geographic region to another, or from one country to another. In some embodiments, a voltage level in a power system (for example, at a transformer 102 output) is about 400 volts. In some embodiments, a voltage level (for example, at a transformer 124 output) in a power system is about 600 volts.

Reserve power systems 120 may each provide reserve power support for some or all of the computer systems 154 supplied by primary power systems 112. In some embodiments, one or more reserve power systems 120 are powered up at all times during operation of data center 100. One or more reserve power systems 120 may be passive until a failure of one or more components of primary power side 110, at which time the reserve power system 120 may become active.

For illustrative purposes, three primary power systems 112 and reserve power systems 120 are shown in FIG. 1 (for clarity, details of only the front primary power system 112 and reserve power system 120 are shown). The number of primary power systems 112 on primary power side 110 and reserve power systems 120 on reserve power side 111 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 112 includes many floor power distribution units 113. As another example, a primary power system may have one UPS that can supply power to many floor power distribution units.

A reserve power system 120 may include transformer 124 and generator 126. Generator 126 may take the form of conventional turbine engines or an alternative storage energy source that includes, but not limited to, energy storage technology such as a bi-directional-inverter Lithium-ion battery system. Transformer 124 may supply power to switchgear 130. Critical reserve distribution board 138 may receive power from switchgear 130. Power from switchgear 130 may pass through UPS 132. Static switch 134 is provided between UPS 132 and critical reserve distribution switchboard 138. Static switch 134 may provide for bypass of UPS 132 (for example, during maintenance of UPS 132, during particular switching operations, etc.). Reserve power system 120 also includes transformer 140. Transformer 140 may transform power from critical reserve distribution switchboard 138.

In some embodiments, a reserve power side 111 includes a reserve power bus ring 146 that communicatively couples one or more reserve power systems 120 with one or more computer systems 154. A reserve power bus ring 146 may include two or more power bus bar assemblies, which may themselves include two or more power bus bars coupled in series, and the power bus bar assemblies may be coupled in series to assemble a "ring" assembly of power bus bars. For example, two adjacent parallel power bus bar assemblies may be coupled at proximate ends to assemble a reserve power bus ring.

Reserve Power Bus Ring 146 may distribute power received from one or more of reserve power systems 120 to one or more computer systems 154 in racks 152. In some embodiments, each of multiple reserve power systems 120 is coupled to the reserve power bus ring 146 and reserve power from each reserve power system 120 is distributed to each of the one or more racks 152 via the reserve power bus ring 146. As shown in the illustrated embodiment, multiple reserve power systems 120 may be coupled to reserve power bus ring 146 on a downstream end and may supply reserve power to the reserve power bus ring 146 to provide reserve power support to one or more of the computer systems 154 also coupled to the reserve power bus ring.

In some embodiments, multiple computer systems are communicatively coupled to a reserve power bus ring. For example, multiple racks 152, and computer systems 154 located therein, may receive reserve power support via power carried on some or all of the reserve power bus ring 146. In the illustrated embodiment, twelve racks 152 are each coupled to reserve power bus ring 146 and may each receive reserve power support from one or more reserve power systems 120 supplying power to reserve power bus ring 146.

In some embodiments, one or more reserve power systems 120 coupled to reserve power bus ring 146 provide reserve power support to all computer systems 154 communicatively coupled to reserve power bus ring 146. A given computer system 154 may have reserve power support redundancy provided by coupling multiple reserve power systems 120 to the ring 146 and may continue to receive reserve power support from some reserve power systems 120 in the event of loss of reserve power support from one or more of the reserve power systems. For example, in the illustrated embodiment, where three reserve power systems 120 are coupled to reserve power bus ring 146, loss of reserve power support to computer systems 154 from one reserve power system 120 may not interrupt reserve power support to any of the computer systems 154, as the other two reserve power systems 120 may continue to provide reserve power support to all of the coupled computer systems 154 via ring 146.

In some embodiments, reserve power side 111 includes an array of automatic transfer switches 150. Automatic transfer switches 150 may control switching of power to computer systems 154 between primary power side 110 and reserve power side 111 and may automatically switch power from one of primary power systems 112 to reserve power distributed from one or more reserve power systems 120 through the reserve power bus ring 146. In some embodiments, one automatic transfer switch is provided for each rack system in a computer room. Thus, an automatic transfer switch may switch input power to the rack between one of floor distribution units 113 and one or more reserve power bus rings via reserve power bus ring 146. In another embodiment, an automatic transfer switch is provided for each half of a rack system. In still another embodiment, automatic transfer switches may be provided at the server level. In certain embodiments, a reserve power system includes manual transfer switches. Manual transfer switches may be used, for example, to enable maintenance operations to be performed.

Although, in the embodiment shown in FIG. 1, power to computer systems is switched between primary power and reserve power, in some embodiments, a data center may not have automatic transfer switches to switch between primary power and reserve power. In some embodiments, for example, computer systems in a rack system (such as computer systems 154 in racks 152) may be dual-supplied by two power systems or include power supplies that accept two our more power source inputs. A computer system may be supported from two power feeds without an automatic transfer switch. In some embodiments, a redundant power system for servers in a data center may operate in an active-active failover configuration. In other embodiments, a redundant power system for servers in a data center may operate in an active-passive failover configuration.

In some embodiments, one or more reserve power systems 120 include an isolation device 144 that selectively isolates the reserve power system 120 from one or more downstream systems and components. For example, isolation device 144 may include a switching device, fault current limiter device, etc. that is operated to at least partially isolate a given reserve power system 120 from one or more computer systems 154 via the reserve power bus ring 146. In some embodiments, such isolation may be implemented based at least in part upon a fault condition upstream of the isolation device. For example, a fault associated with source power from one or more of transformer 124 or generator 126 may prompt implementing isolation device 144 to isolate reserve power system 120 from one or more racks 152 via the reserve power bus ring 146. In some embodiments, each isolation device 144 is internally controlled. The isolation device may include fault detection circuitry such that when a fault condition is detected in the reserve power system 120, the isolation device 144 automatically at least partially isolates the reserve power system 120 from the reserve power bus ring 146.

In some embodiments, one or more reserve power systems 120 further include controller 142. Controller 142 may serve various control functions in reserve power side 111. In some embodiments, controller 142 may control some or all of automatic transfer switches 150. Controller 142 may control some or all of isolation devices 144 in one or more reserve power systems 120. Controller 142 includes reserve overload protect circuit 143. In certain embodiments, controller 142 includes at least one programmable logic controller. The programmable logic controller may control some or all of the switching in or among devices in reserve power side 111. In some embodiments, controller 142 at least partially controls some or all systems and components in each of the reserve power systems 120 to ensure synchronization of power distributed to reserve power bus ring 146. For example, controller may control each UPS 132 in one or more of reserve power systems 120 to ensure that power outputs from each UPS are synchronized. In addition, controller 142 may monitor one or more systems and components of one or more reserve power systems 120 to determine whether power outputs from each of one or more reserve power systems 120 is synchronized. In some embodiments, some or all of controller 142 is located externally to some or all of the reserve power systems 120. In some embodiments, some or all of controller 142 is implemented, in part or in full, by one or more computer systems.

In some embodiments, shunt trips (not shown) are provided for each coupling of a rack system 152 to the reserve power bus ring 146. Shunt trips, which may be upstream or downstream of a given switch 150 for a rack system 152, may provide overload protection for reserve power side 111. For example, if automatic transfer switches 150 switch too much of the load from computer systems 154 to reserve power systems 120 via reserve power bus ring 146, some shunt trips may shed their respective couplings (and thus shut down the computer systems 154 that are receiving reserve power from the reserve power bus ring 146 via those couplings). The shedding of computer systems may be based, for example, on priority of the various computer systems receiving power from reserve power bus ring 146. In certain embodiments, shunt trips are controlled by reserve overload protect circuit 143 of controller 142.

In some embodiments, each automatic transfer switch 150 is internally controlled. The automatic transfer switch may include fault detection circuitry such that when a fault condition is detected in the primary power input, the automatic transfer switch automatically switches to reserve power. Thus, for the computer systems coupled to the switch, in the event of a failure in any of the elements on primary power side 110 upstream from an automatic transfer switch 150, including floor power distribution unit 113, UPS 108, or switchgear 106, the automatic transfer switch may transfer input power from primary power to reserve power. Following such transfer, the computer systems that have been switched to reserve power may receive power from one or more reserve power systems 120 via reserve power bus ring 146. In addition, the computer systems that have been switched to reserve power may be protected against power interruption by one or more UPSs 132. In one embodiment, failover from primary power to reserve power is carried out within about 8 to about 20 milliseconds.

In some embodiments, some or all of a reserve power system is oversubscribed to one or more electrical loads. As used herein, "oversubscribed" refers to a condition in which total power requirements of the systems coupled to a reserve power system exceed the capacity of some or all of the reserve power system to supply reserve power (which includes, for example, exceeding the capacity of a sub-system such as a reserve UPS). For example, a reserve power system 120 might have 5 racks 152 coupled to it, but only be able to provide reserve power to one of the racks 152 at any given time through a downstream component. In some embodiments, a reserve power system 120 may be heavily oversubscribed (for example, subscribed at several times the capacity of the reserve power system). In certain embodiments, oversubscription is applied at a facility-wide level.

In some embodiments, the total power requirements of computer systems 154 exceed the capacity of some or all of one or more reserve power systems 120, such that a given reserve power system 120 is oversubscribed relative to its capacity at various components in power system 120. For example, the total power requirements of all computer systems 154 in data center 100 may exceed 200 KVA, and the load capacity of a given reserve power system 120 at the switchgear 130 may also exceed 200 KVA, while the load capacity of reserve power system 120 downstream of the UPS 132 and static switch 134 may be about 20 KVA. Thus, if all of primary power systems 112 failed simultaneously and automatic transfer switches 150 transferred all of computer systems 154 in data center 100 to reserve power system 120, reserve power system 120 would not be able to supply power to all of the computer systems through one of the UPS 132 and static switch 134. In some embodiments, a reserve power system may include overload protection against overload caused, for example, by switching of loads to the reserve power system in excess of capacity. In one embodiment, a reserve power system may have multiple computer rooms coupled to the reserve power system, but have the capacity to support one the computer systems of only one computer room at any given time.

In some embodiments, the effects of oversubscription may be at least partially mitigated through coupling multiple reserve power systems 120 to computer systems 154 via reserve power bus ring 146, where reserve power systems 120 may concurrently provide reserve power support to some or all of the computer systems 154, so that the total capacity of the reserve power systems 120 to provide reserve power support meets the power requirements of at least some of the computer systems 154. For example, the total power requirements of all computer systems 154 in data center 100 may exceed 200 KVA, and the load capacity of a given reserve power system 120 at downstream of the UPS 132 and static switch 134 may be about 100 KVA, but three such reserve power systems may be coupled to the computer systems 154 via reserve power bus ring 146. Thus, if all of primary power systems 112 failed simultaneously and automatic transfer switches 150 transferred all of computer systems 154 in data center 100 to reserve power system 120, the reserve power systems 120 in reserve power side would be able to supply power to all of the computer systems through reserve power bus ring 146, provided that at least two of the reserve power systems 120 are actively supplying power to the reserve power bus ring 146.

In another example, the total power requirements of all computer systems 154 in data center 100 may exceed 200 KVA, and the load capacity of a given reserve power system 120 at downstream of the UPS 132 and static switch 134 may be about 50 KVA, but three such reserve power systems may be coupled to the computer systems 154 via reserve power bus ring 146. Thus, the three reserve power systems 120 may be able continue to provide reserve power support if some, or even most, of the primary power systems 112 failed simultaneously and automatic transfer switches 150 transferred some, or even most, of computer systems 154 in data center 100 to the reserve power bus ring, provided that not all of the primary power systems 112 failed simultaneously. Thus, while an individual reserve power system 120 may be heavily oversubscribed (for example, subscribed at several times the capacity of the reserve power system), the collective reserve power systems 120 in reserve power side 111 may be lightly oversubscribed (for example, subscribed at only 1.2 times the total capacity of all of the reserve power systems 120), fully subscribed, undersubscribed, etc.

Figure 2:
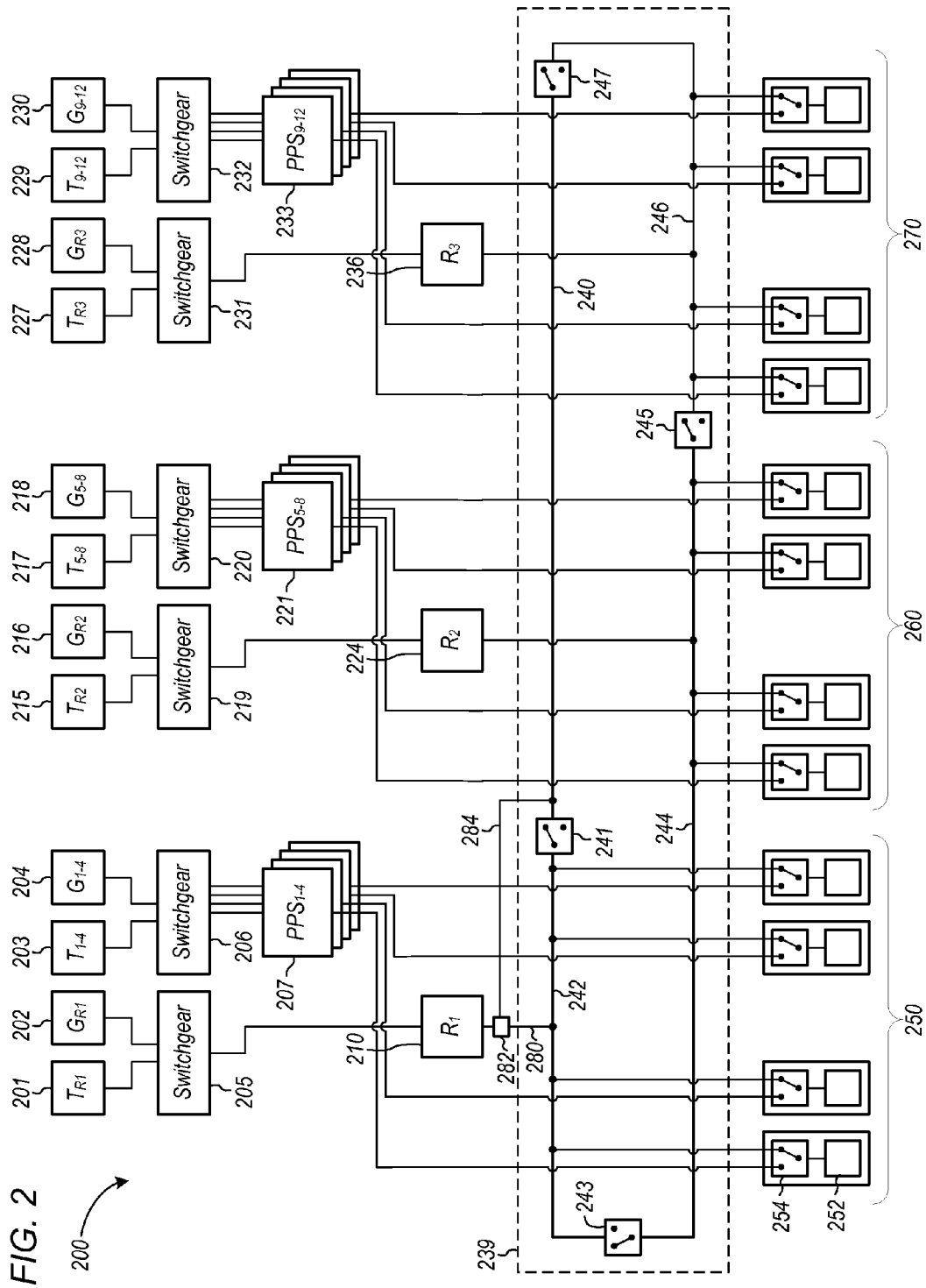
FIG. 2 is a schematic illustrating one embodiment of a data center having a reserve power bus ring coupling reserve power systems to rack computer systems via various portions of the reserve power bus ring.

FIG. 2 is a schematic illustrating one embodiment of a data center having a reserve power bus ring coupling reserve power systems to rack computer systems via various portions of the reserve power bus ring. Data center 200 includes racks 250-270, primary power systems 207, 221, 233, reserve power systems 210, 224, 236, and reserve power bus ring 239. Each of racks 250-270 and reserve power systems 210, 224, 236 are communicatively coupled to one or more portions 240, 242, 244, 246 of reserve power bus ring 239 and receive reserve power support from one or more reserve power systems through at least the respective one or more portions of ring 239.

In some embodiments, each primary power system provides primary power support to a particular limited set of the downstream electrical loads exclusively and independently of the other primary power systems, and each reserve power system is configured to provide reserve power support to each of the downstream electrical loads, concurrently with the other reserve power systems, via the reserve power bus ring. A primary power system providing primary power support to a set of electrical loads, independently of primary power support provided by other primary power systems to other electrical loads, may be understood to be providing "independent" primary power support to the set of electrical loads. For example, in the illustrated embodiment, each primary power system of set 207 can provide primary power support to a separate rack in rack set 250 independently of other racks in set 250, and the set of primary power systems 207 can collectively provide primary power support to the set of racks 250 from power source 203, 204 independently of the racks in sets 260 and 270. In addition, reserve power system 210, which may be oversubscribed to the racks in data center 200, can provide reserve power support to each rack in set 250 via ring portion 242 and can further provide reserve power support to each rack in sets 250, 260, and 270 via coupled ring portions. Furthermore, each rack in rack set 250 can receive concurrent reserve power support concurrently from each of reserve power systems 210, 224, 236 while receiving independent primary power support from one of the primary power systems in set 207. Thus, while the primary power systems in data center 200 may provide primary power support to certain loads independently of other primary power systems and other loads, the reserve power systems in data center 200 may provide reserve power support to some or all of the loads in the data center 200, and multiple reserve power systems can concurrently (i.e., in parallel) provide reserve power support to one or more of the loads. An oversubscribed reserve power system 210 may be oversubscribed to racks in set 250, all of the racks in all sets 250, 260, 270, some combination thereof, or the like.

In some embodiments, a reserve power bus ring includes one or more "portions". Such portions may be defined by an assembly of one or more various devices and power bus bars, and respective portions of a reserve power bus ring may be isolatable from each other. For example, in the illustrated embodiment, reserve power bus ring 239 includes four separate portions 240, 242, 244, and 246 which are each defined by an assembly of one or more power bus bars bounded at each end by two of isolation devices 241, 243, 245, 247, such that each portion has an isolation device located at each end of the portion. As discussed further below with reference to FIG.

3, isolation devices can collectively isolate a given ring portion from some or all of the remaining portions of a reserve power bus ring.

In some embodiments, one or more sets of racks, and one or more computer systems therein, are coupled to one or more portions of a reserve power bus ring and receive reserve power support through at least the portion of the ring to which they are coupled. A given rack may include one or more computer systems 252 and one or more transfer switches 254 that selectively route one or more power feeds to the computer systems 252. For example, in the illustrated embodiment, each set of racks 250-270 includes racks with at least one computer system 252 and at least one automatic transfer switch 254 that is communicatively coupled to a respective primary power system ("PPSx") and to one or more reserve power systems ("R$_x$") via one or more portions of reserve power bus ring 239, where a given automatic transfer switch 254 selectively routes power from a primary power system or reserve power bus ring 239 to one or more computer systems 252.

In some embodiments, one or more sets of racks are coupled to separate portions of a reserve power bus ring. For example, as shown in the illustrated embodiment, data center 200 includes three separate sets of racks 250, 260, 270, where racks in each set are individually coupled to separate portions 242, 244, 246 of reserve power bus ring 239, respectively. In some embodiments, as shown by portion 240, one or more portions of a reserve power bus ring 239 may have no coupled racks. In some embodiments, a "set" of racks includes racks that receive primary power support from a particular set of primary power systems. For example, each rack in rack set 250 may receive primary power support from one or more of primary power systems 207, each rack in rack set 260 may receive primary power support from one or more of primary power systems 221, and each rack in rack set 270 may receive primary power support from one or more of primary power systems 233.

In some embodiments, a set of primary power systems may include primary power systems receiving source power from one or more distinct power sources, switchgear, etc. For example, each of primary power systems 207 may receive source power from one of transformer 203 and generator 204 via switchgear 206, each of primary power systems 221 may receive source power from one of transformer 217 and generator 218 via switchgear 220, and each of primary power systems 233 may receive source power from one of transformer 229 and generator 230 via switchgear 232. Transformers 201, 203, 215, 217, 227, 229 may receive source power from one or more sources, including one or more distinct utility power sources.

Similarly to the primary power systems, in some embodiments, separate reserve power systems may receive source power from one or more distinct power sources. For example, reserve power system 210 may receive source power from one of transformer 201 and generator 202 via switchgear 205, reserve power system 224 may receive source power from one of transformer 215 and generator 216 via switchgear 219, and reserve power system 236 may receive source power from one of transformer 227 and generator 228 via switchgear 231.

In some embodiments, one or more reserve power systems are coupled to one or more portions of a reserve power bus ring and provide reserve power support to one or more electrical loads coupled to one or more portions of the reserve power bus ring. For example, in the illustrated embodiment, each reserve power system 210, 224, 236 is coupled to a separate portion of the reserve power bus ring. As discussed further below, reserve power system 210 is coupled to two separate portions 240, 242 of the reserve power bus ring 239 through a switching device 282.

In some embodiments, each reserve power system coupled to a given portion of a reserve power bus ring can provide reserve power support to one or more electrical loads coupled to that portion. For example, reserve power system 210 provides reserve power support to at least computer systems 252 in rack set 250 coupled to ring portion 242, reserve power system provides reserve power support to at least computer systems 252 in rack set 260 coupled to ring portion 244, and provides reserve power support to at least computer systems 252 in rack set 250 coupled to ring portion 246. In some embodiments, where each ring portion is isolated from one or more other ring portions, a reserve power system can continue to provide reserve power support to loads directly coupled to the same ring portion as the reserve power system. For example, where isolation devices 241 and 243 isolate ring portion 242, reserve power system 210 may continue to provide reserve power support to computer systems 252 in rack set 250.

In some embodiments, one or more reserve power systems coupled to one or more portions of a reserve power bus ring, including a coupling via a bus bar connection, provide reserve power support to electrical loads coupled to some or all portions of the reserve power bus ring, including portions of the reserve power bus rings to which the reserve power systems are not directly coupled via a bus bar connection. Such reserve power systems can concurrently provide reserve power support to all electrical loads coupled to the reserve power bus ring. For example, in the illustrated embodiment, although reserve power system 224 is directly coupled to ring portion 244, reserve power system 224 can provide reserve power support to computer systems 252 of rack sets 250, 26, and 270 when the ring portions 242 and 246 are not isolated from ring portion 244. As a result, reserve power bus ring 239 enables concurrent and redundant reserve power support for computer systems 252 of each rack set 250, 260, 270 that can continue for a given computer system in the event of isolation of one or more ring portions from a remainder of the reserve power bus ring 239.

In some embodiments, one or more isolation devices 241, 243, 245, 247 can selectively couple or at least partially isolate two or more portions of reserve power bus ring 239. An isolation device may include a device that can at least partially isolate two electrical pathways and may include one or more switching devices, fault current limiter devices, etc. As shown, each isolation device may define an end of two or more power bus ring portions, and the isolation device may selectively couple or isolate such ends. For example, where isolation device 241 is a switching device, the device 241 may couple proximate ends of the ring portions 240 and 242 by switching to close a connection between the portions and may isolate the proximate ends by switching to break the connection. Such switching may be controlled by one or more controllers, which may be implemented by one or more computer systems. Such controllers may operate two or more isolation devices to isolate particular ring portions based at least in part upon determination of a fault condition associated with the particular ring portions. For example, a controller may operate isolation devices 241 and 243 to each break connections between ring portion 242 and portions 240 and 244, respectively, thus collectively isolating ring portion 242 from the remaining portions of reserve power bus ring 239, based at least in part upon determination of a fault condition in one or more systems and components associated with ring portion 242. Such a fault condition may include abnormal parameters of electrical power in the power bus portion (e.g., abnormal current, voltage, etc.), determined physical damage to a power bus bar included in the portion 242, abnormal parameters of power received from a reserve power system 210 coupled to the reserve power bus ring portion 242, etc. For example, an abnormal current in a power bus portion may be determined based at least in part upon the current in the power bus portion exceeding a certain predetermined threshold current. By isolating the portion 242 associated with the fault condition, other loads coupled to other ring portions are protected from the effects of the fault condition. In addition, because other reserve power systems are coupled to other ring portions, the loads coupled to those other ring portions may continue to receive redundant and concurrent reserve power support in the event of isolation of one or more particular ring portions. In some embodiments, one or more of isolation device 241, 243, 245, 247 is at least partially internally controlled. One or more isolation devices may include fault detection circuitry such that when a fault condition is detected, the isolation device automatically at least partially isolates at least part of a ring portion from another ring portion, which can include limiting a current between two ends of two respective portions, breaking an electrical connection between two ends of two respective portions, etc.

In some embodiments, one or more reserve power systems are coupled to multiple portions of a reserve power bus ring. Such multiple coupling, which may be regulated at least in part by one or more switching devices that selectively route power from the reserve power system to a selected one or more of the coupled ring portions, can allow the reserve power system to continue to provide reserve power support to electrical loads through various ring portions in the event of isolation of one or more other ring potions to which the reserve power system is coupled. For example, as shown in the illustrated embodiment, reserve power system 210 is coupled to ring portion 242 via line 280 and is coupled to ring portion 240 via line 284, and switching device 282 may selectively route power from the reserve power system 210 to one or more of the ring portions. Switching device 282 may be controlled, at least in part, by a controller that controls one or more of the isolation devices in data center 200, to selectively route power through one of the lines 282, 284 based upon isolation of one or more portions of reserve power bus ring 239. For example, where a controller commands isolation devices 241, 243 to isolate portion 242 due to a fault in the ring portion itself, a controller may command switching device 282 to divert power from reserve power system 210 away from line 280 and to line 284, so that reserve power system 210 continues to provide reserve power support to computer systems 252 of rack sets 260, 270 via ring portion 240 which may remain coupled to ring portions 244, 246. In some embodiments, a reserve power system may be concurrently coupled to multiple ring portions without a switching device selectively routing power to one of various pathways, where power support is concurrently provided through two or more pathways. For example, referring to the illustrated embodiment, switching device 282 may be absent, and reserve power system 210 may concurrently provide power to reserve power bus ring 239 through both lines 280 and 284.

Figure 3:
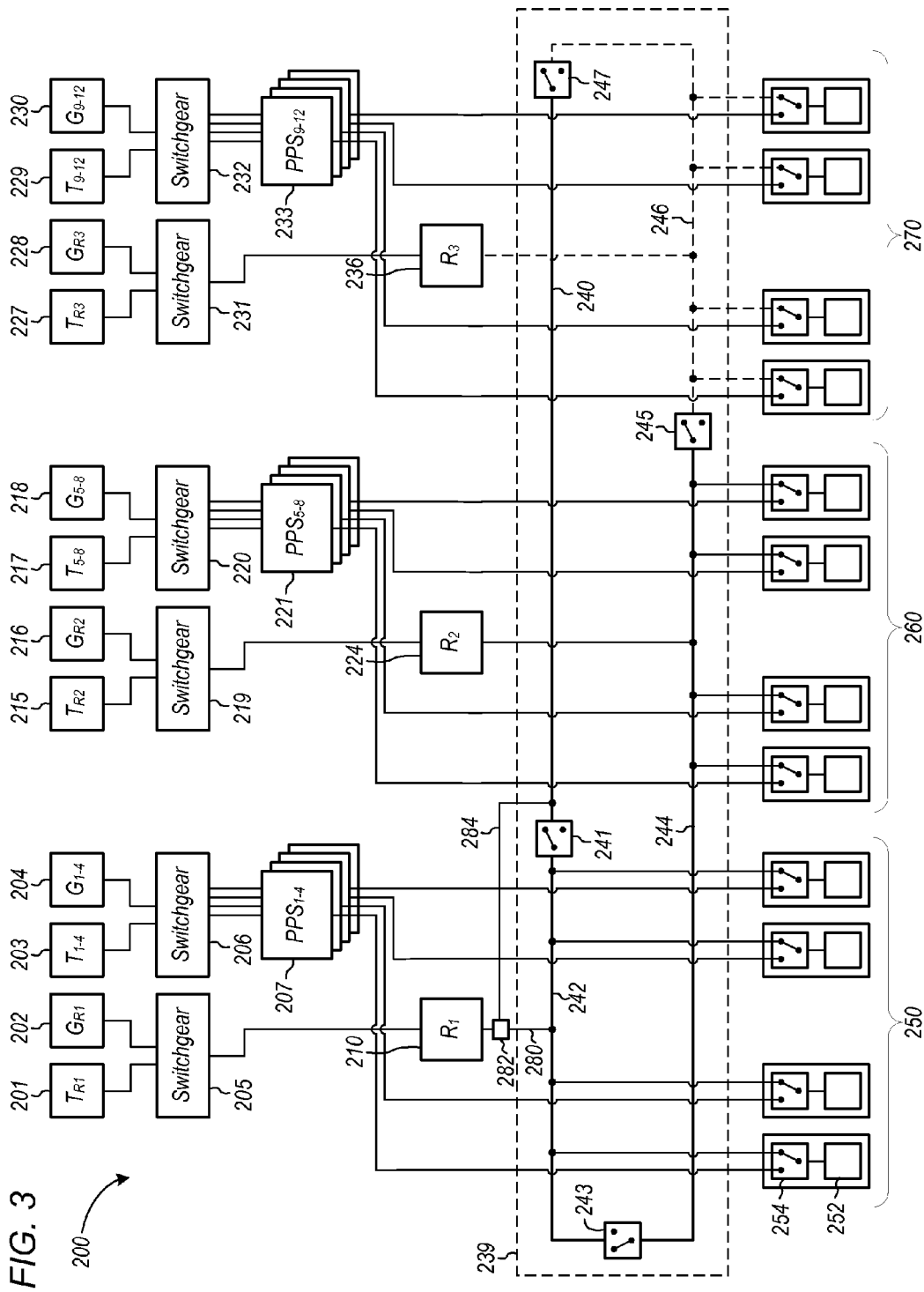
FIG. 3 is a schematic illustrating one embodiment of a data center having a reserve power bus ring with an isolated ring portion.

FIG. 3 is a schematic illustrating one embodiment of a data center having a reserve power bus ring with an isolated ring portion. Data center 200, illustrated and discussed further above with reference to FIG. 2, includes a reserve power bus ring 239 where isolation devices 245 and 247 have collectively isolated ring portion 246, and the reserve power system 236 and rack set 270 coupled to it, from the remaining portions 240, 242, 244 of the reserve power bus ring 239.

In some embodiments, as discussed above, a reserve power bus ring enables redundant and concurrent reserve power support for one or more coupled electrical loads, where such support continues uninterrupted where one or more ring portions, to which one or more reserve power systems are coupled, are isolated from the remaining ring portions. For example, as shown in the illustrated embodiment, ring portion 246 is isolated from the remaining ring portions of reserve power bus ring, so that computer systems 252 in rack sets 250 and 260 lose reserve power support from reserve power system 236. Such isolation may have been implemented based at least in part upon determination of a fault condition associated with ring portion 246, reserve power system 236, some combination thereof, or the like. However, reserve power systems 210 and 224 may remain communicatively coupled to rack sets 250 and 260 via coupled ring portions 240, 242, 244 and thus continue to provide reserve power support for computer systems 252 in each of such rack sets.

In some embodiments, electrical loads directly coupled to an isolated ring portion continue to receive reserve power support from reserve power systems also directly coupled to the isolated ring portion, even though the ring portion is isolated from other ring portions. For example, where ring portion 246 is isolated from ring portions 240, 242, 244 based at least in part upon a loss of synchronization between a source power to reserve power system 236 and source power for each of reserve power systems 210, 224, reserve power system 236 may continue to provide reserve power support to computer systems 252 in rack set 270. In another example (not shown), where ring portions 244 and 246 are both isolated from ring portions 240, 242, reserve power systems 224 and 236 may each continue to provide reserve power support to computer systems 252 in rack sets 260 and 270, and reserve power system 210 may continue to provide reserve power support to computer systems 252 in rack set 250.

Figure 4:
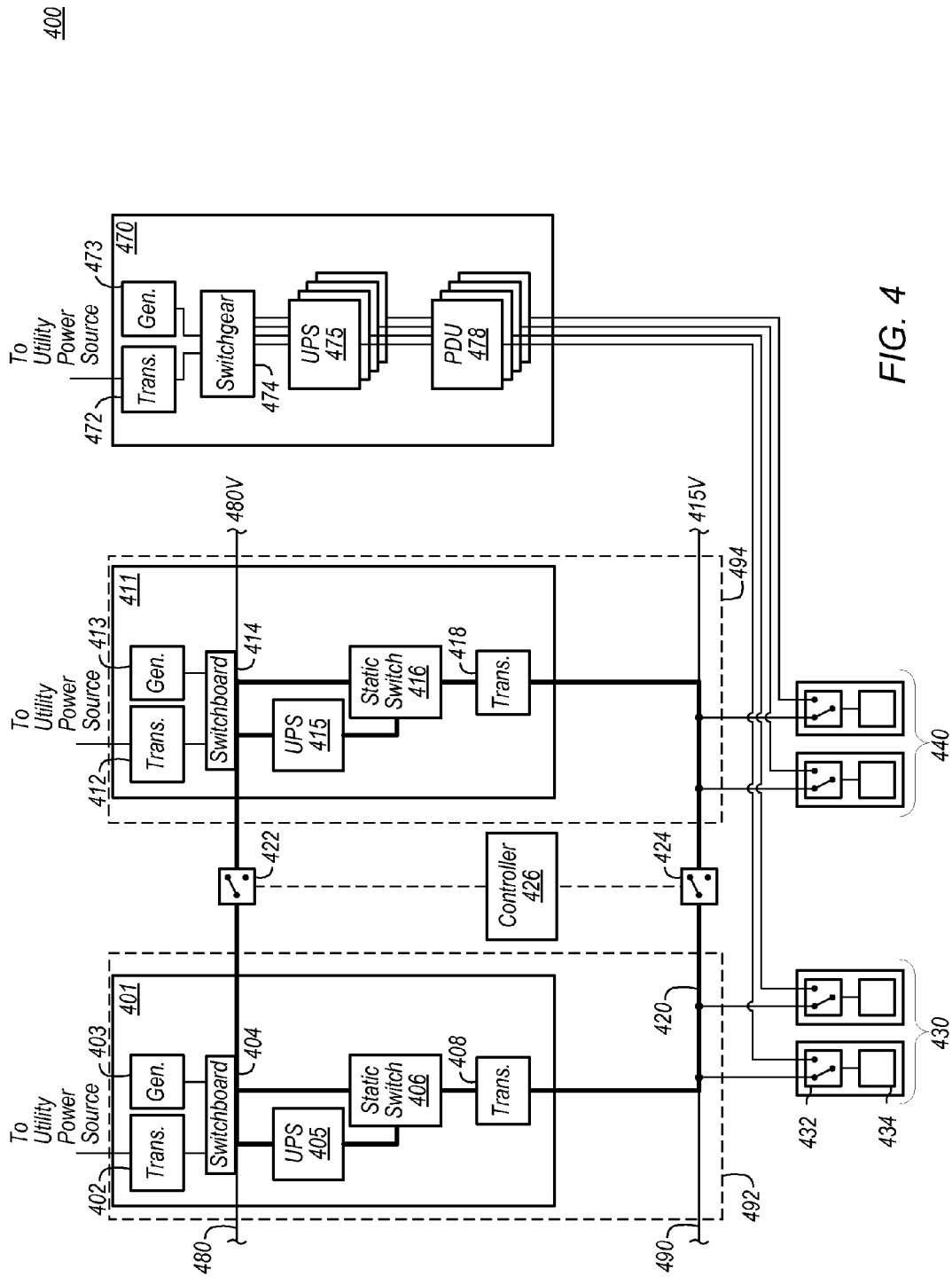
FIG. 4 is a schematic illustrating one embodiment of a data center having a reserve power bus ring coupling reserve power systems and rack computer systems via upstream and downstream power bus connections.

FIG. 4 is a schematic illustrating one embodiment of a data center having a reserve power bus ring coupling reserve power systems and rack computer systems via upstream and downstream power bus connections. Data center 400 includes a primary power system 470, reserve power systems 401 and 411, two separate "sets" of rack computer systems 430 and 440, and a reserve power bus ring 420 coupling the reserve power systems and rack computer systems. The reserve power bus ring 420, in some embodiments and as shown by the boldface tracing of electrical pathways in FIG. 4, may comprise electrical pathways in each of two or more reserve power systems that are coupled at each of an upstream and a downstream end. Such couplings may be implemented at least partially by one or more power bus bars.

In some embodiments, a reserve power bus ring extends at least partially through and between two or more reserve power systems, where the ring extends across one or more voltage gradients such that some portions carry power at different voltages. Such a reserve power bus ring may include a power bus bar assembly that couples two or more reserve power systems at an upstream end, a power bus bar assembly that couples two or more reserve power systems at a downstream end, and two or more electrical pathways through the two or more reserve power systems that communicatively couple the power bus bar assemblies to form a ring. The reserve power bus ring may couple two or more reserve power systems together at different sides of one or more voltage gradients and may enable electrical loads coupled at a downstream section of the reserve power bus ring to receive reserve power support from one or more of the reserve power systems through systems and components of one or more of the reserve power systems.

In some embodiments, each of primary power system 470 and the reserve power systems 401, 411 include respective transformers 472, 402, 412 and generators 473, 403, 413 that may be selectively used to supply source power. Primary power system 474 includes switchgear that can selectively power from one of the transformer 472 and generator 473 to one or more UPSs 475 and PDUs 478 which distribute primary power feeds to each rack computer systems in sets 430 and 440, so that the primary power system 470 provides primary power support to each computer system 434 in the rack computer system sets 430, 440 via respective automatic transfer switches 432. Each reserve power system 401, 411 includes a respective switchboard 404, 414 that distributes power through a respective UPS 405, 415. Power can also distributed to bypass a respective UPS 405, 415 via a respective static switch 406, 416. Power is then stepped-down through a respective transformer 408, 418 and distributed to one or more computer systems 434 communicatively coupled to a "downstream" power bus bar assembly 490. The "downstream" power bus bar assembly 490 may be so referenced based at least in part upon the power bus bar assembly, which may include two or more power bus bars coupled together, extending between at least two ends of each reserve power system 401, 411 downstream of respective voltage gradients in each system. For example, as shown, downstream power bus bar assembly 490 may carry power at 415 volts, where the power is stepped down to the 415-volt level in each reserve power system at least in part through respective transformers 418. Thus, each reserve power system 401, 411 may include a voltage gradient across at least respective transformers 408, 418 and downstream power bus bar assembly 490 is coupled to each reserve power system downstream of their respective gradients.

In some embodiments, including the embodiment illustrated in FIG. 4, reserve power systems 401 and 411, in addition to being coupled on a downstream end via downstream power bus bar assembly 490, are coupled on an "upstream" end via "upstream power bus bar assembly 480, where the power bus bar is coupled to each reserve power system upstream of their respective voltage gradients. For example, as shown, power bus bar assembly 480 carries power at 480 volts, which may be stepped down from a source power voltage through one or more of transformers 402, 412. A source power voltage, for example, may be approximately 12 kilovolts, and each of transformers 402, 412 may step down the voltage to 480 volts. As further illustrated in reserve power systems 401, 411, some embodiments include power bus bar assembly 480 extending at least partially through switchboards 404, 414 in each reserve power system 401, 411, such that power can be exchanged between the reserve power systems. For example, source power from transformer 412 may be supplied to UPS 405 via power bus bar assembly 480, and vice versa concerning at least transformer 402 and UPS 415.

In some embodiments, computer systems coupled to downstream bus bar assembly 490 of the reserve power bus ring 420 receive concurrent and redundant reserve power support from reserve power systems 401 and 411. One or more computer systems 434 may continue to receive reserve power support in the event of a loss of reserve power from one of the reserve power systems. In addition, in some embodiments, systems and components of each reserve power system 401, 411 may be at least partially supported with source power from the other reserve power system, such that loss of source power for one of the reserve power systems can be at least partially mitigated with source power from the other reserve power system to enable the one reserve power system to continue to provide reserve power support using source power from the other reserve power system. For example, a loss of source power from transformer 402 may be mitigated with source power from transformer 412 being supplied to transformer 408 via upstream power bus bar assembly 480. Such concurrent and redundant source power support can, in some embodiments, enable continued reserve power support to computer systems 434 where loss of reserve power support from one of the reserve power systems would leave the remaining reserve power system oversubscribed to computer systems 434 and unable to supply enough reserve power to meet the power requirements of the computer systems 434.

In some embodiments, one or more isolation devices 422, 424 are located on each of the upstream and downstream power bus bars 480 and 490. In some embodiments, one or more isolation devices may be commanded to selectively break, limit, etc. connections between portions of the respective power bus bars, thereby selectively partially or fully isolating portions of reserve power bus ring 420. Such commands may be provided to one or more isolation devices, at least in part, by controller 426, which may be externally located to one or more of reserve power systems 401, 411 in data center 400. Controller 426 may monitor various systems and components in data center 400 and, based at least in part upon such monitoring, command isolation devices 422 and 424 to break connections between portions of the respective power bus bars 480, 490, thereby isolating respective portions 492, 494 of the reserve power bus ring from each other. Such isolating may isolate respective reserve power systems 401 and 411 from receiving source power support from each other. In addition, such isolating of portions 492, 494 may isolate computer systems 434 in set 430 of rack computer systems from receiving reserve power support from reserve power system 411, and vice versa concerning computer system 434 in set 440 of rack computer systems and reserve power system 401. As discussed above with reference to FIG. 2, in some embodiments, one or more isolation devices may be at least partially internally controlled.

In some embodiments, isolation of respective portions 492, 494 of reserve power bus ring 420 is based at least in part upon determinations made at controller 426 regarding fault conditions associated with one or more systems and components in data center 400. A fault condition may be associated with source power synchronization between reserve power systems 401, 411. For example, where reserve power system 411 switches source power support to generator 413, the source power may not be synchronized with source power supplied to reserve power system 401 via transformer 402 and controller 426 may respond determining a fault condition has occurred. Such a determination may lead to isolation devices 422 and 424 at least partially isolating portions 492 and 494, such that rack set 430 and 440 receive separate reserve power support from respective reserve power systems 401 and 411. For example, controller 426 may respond to the above determination by commanding isolation devices 422 and 424 to at least partially isolate portions 492, 494. In another example, where downstream power bus 490 has a breaking capacity of 400-amps of current, and a fault in reserve power system 411 results in a current in the portion of downstream power bus bar 490 in portion 494 exceeding 400 amperes, isolation devices 422 and 424 may isolate portion 494 from portion 492 to limit the current through portion 492 to a particular current, to protect computer systems 434 in rack set 430 from being damaged by the excessive current in portion 494 and to ensure uninterrupted reserve power support to rack set 434 via unaffected reserve power system 401.

In some embodiments, one or more of isolation devices 422, 424 selectively control power flow through their respective power bus bar assemblies 480, 490 based at least in part upon internal controllers, mechanics, etc. For example, isolation devices 422, 424 may include fault current limiter devices that limit power flow through the respective bus bars to a certain predetermined current. Isolation device 424 may include a fault current limiter device that limits power flow between portions 492, 494 to a 4000-ampere current in the event of a fault in one or more of the portions. In another example, where a fault condition in reserve power system 411 results in a current of 100 kA in portion 494 of downstream bus bar assembly 490, isolation device 424 may include a fault current limiter device that limits the current through portion 492 of downstream bus bar assembly to 50 kA. In another example, and with reference to isolation devices as illustrated and discussed in at least FIG. 1-6, an isolation device may include a normally-closed sectioning switch that breaks an electrical connection between two portions of a reserve power bus ring based at least in part upon a determination of a fault condition associated with either portion. Such a determination may be made local to an isolation device, using one or more computer systems local to the device, located on another device, etc.

Figure 5:
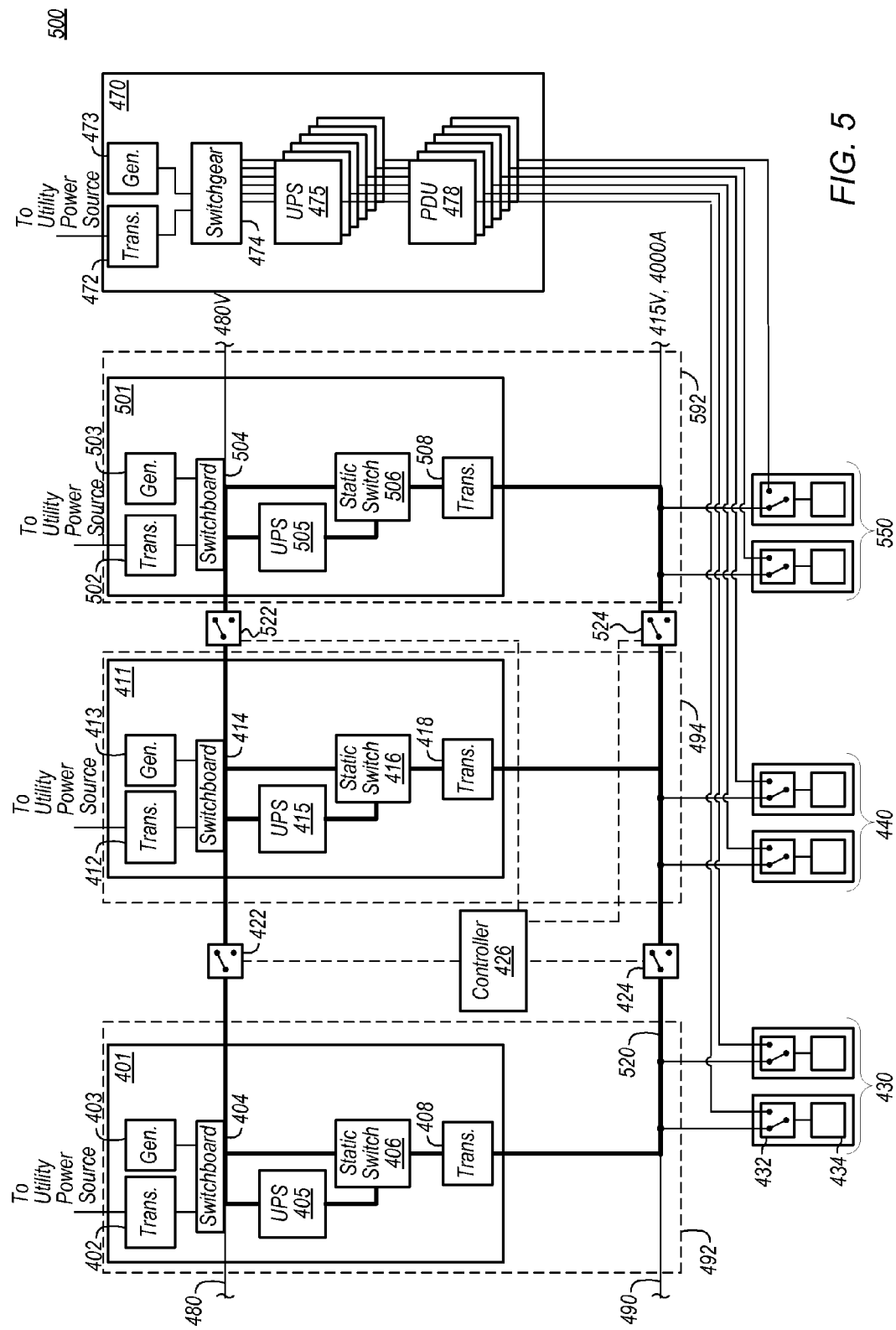
FIG. 5 is a schematic illustrating one embodiment of a data center having a reserve power bus ring coupling reserve power systems and rack computer systems via upstream and downstream power bus connections.

FIG. 5 is a schematic illustrating one embodiment of a data center having a reserve power bus ring coupling reserve power systems and rack computer systems via upstream and downstream power bus connections. As shown in the illustrated embodiment, some embodiments of a reserve power bus ring 520 extend across multiple reserve power systems on upstream and downstream sides.

In some embodiments, a reserve power bus ring extends in parallel through multiple reserve power bus systems, where each reserve power system receives concurrent and redundant support from power sources of each of the reserve power systems and each electrical load coupled to the ring received concurrent and redundant reserve power support from each of the reserve power systems through which the ring extends. For example, as shown in the illustrated embodiment, data center 500 includes a reserve power bus ring 520 that extends through each of reserve power systems 401, 411, and 501. Reserve power system 501 includes similar systems and components as reserve power systems 401 and 411, including transformer 502, generator 503, switchboard 504, UPS 505, static switch 506, and transformer 508. Reserve power system 501, which is included in a separate portion 592 of reserve power bus ring 520 to which a separate set 550 of rack computer systems is coupled, can provide concurrent and redundant reserve power support and source power support in addition or in place of one or more of reserve power systems 401 and 411. For example, where isolation devices 422 and 424 isolate ring portion 492 from ring portions 494 and 492, reserve power system 501 can provide concurrent and redundant source power and reserve power support to reserve power system 411 and computer systems in rack computer system sets 440 and 550. Isolation devices 522 and 524 may be commanded to selectively isolate portion 592 from other portions of ring 520.

In some embodiments, one or more isolation devices in data center 500 may operate based at least in part upon commands received from one or more external controllers. For example, as shown in the illustrated embodiment, controller 426 may be coupled to each isolation device 422, 424, 522, 524 and may command some or all of the isolation devices to collectively isolate one or more portions of the reserve power bus ring 520 based at least in part on a determination of a fault condition associated with one or more of the ring portions.

Figure 6:
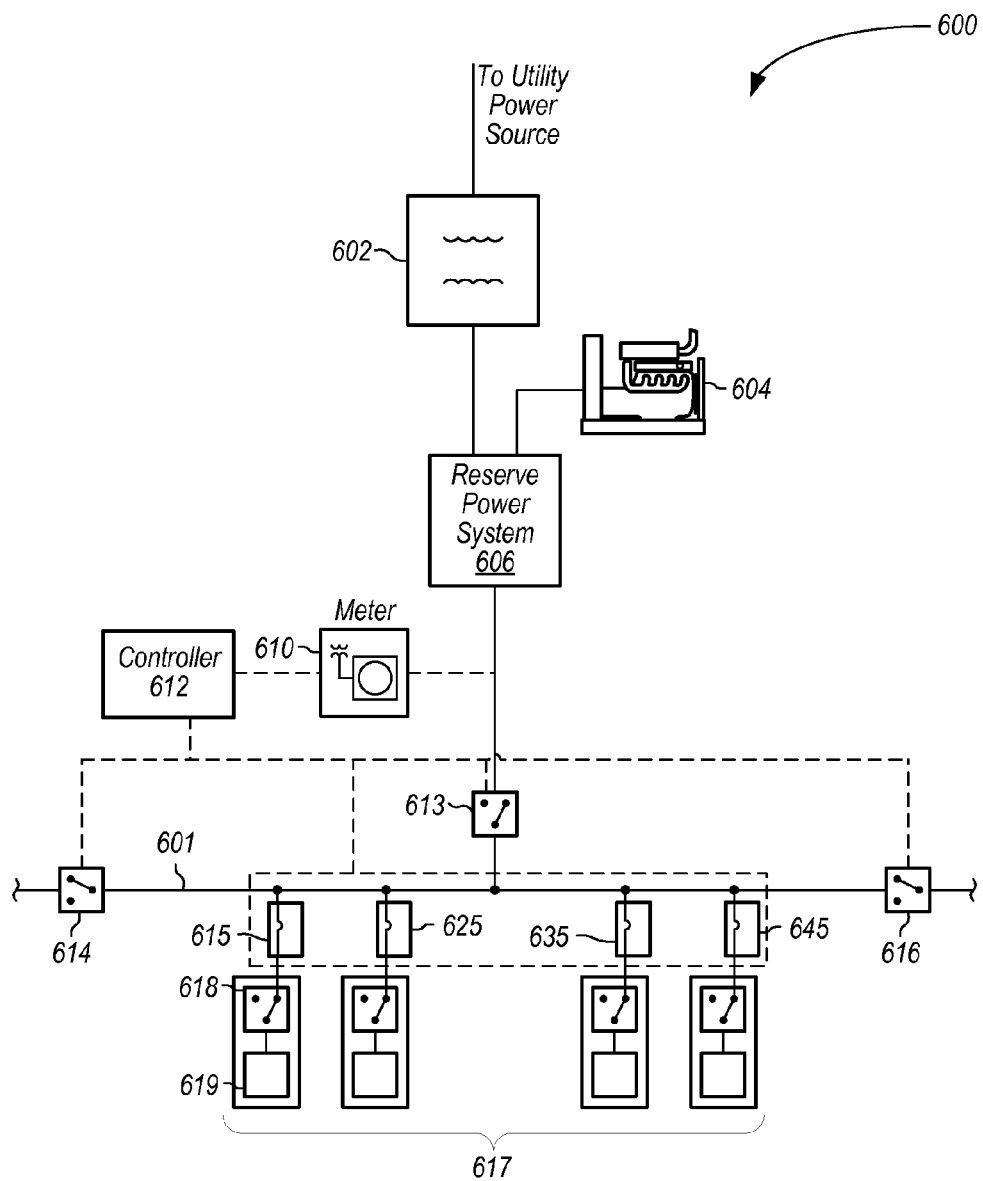
FIG. 6 is a schematic illustrating one embodiment of a reserve power bus ring portion to which reserve power system and rack computer systems are coupled.

FIG. 6 is a schematic illustrating one embodiment of a reserve power bus ring portion to which reserve power system and rack computer systems are coupled. Reserve power side 600 of a data center includes a reserve power system 606, a set 617 of rack computer systems, and a portion 601 of a reserve power bus ring to which the reserve power system 606 and set 617 of rack computer systems are coupled. Reserve power from a utility feed (with or without step-down transformation), a generator, or a UPS may be included in reserve power system 606. In one embodiment, a reserve power system UPS, step-down transformer, and generator are similar to those described above with respect to one or more of FIG. 1-5. Thus, in some embodiments, an output of power from reserve power system 606 may include power transmitted at 415 volts, three-phase power.

Reserve power bus ring portion 601, in some embodiments, comprises one or more power bus bars coupled in series that distribute reserve power from reserve power system 606 to computer systems 619 in rack systems 617. Such reserve power may be selectively routed from the ring portion 601 to one or more particular computer systems 619 based at least in part on a switching position of one or more automatic transfer switches 618 in a given rack system 617. Automatic transfer switches 618 may automatically switch power between primary power support and reserve power support from reserve power system 606 via ring portion 601. Each of automatic transfer switches 618 may switch power to computer systems 619 in one half rack of a rack in which the computer systems 619 are located.

In some embodiments, computer systems 619 receive reserve power support from one or more other reserve power systems (not shown) via one or more other portions (not shown) of the reserve power bus ring that are communicatively coupled to portion 601 through one or more of isolation devices 614, 616. Such isolation devices, as discussed above, may include one or more normally-closed switching devices that permit power to be passed through ring portion 601 from other ring portions and isolate ring portion 601 from one or more other ring portions based at least in part on a determination of a fault condition associated with one or more ring portions, which may include ring portion 601.

In some embodiments, an automatic transfer switch includes a dual input including a primary and secondary input each at 200-240 VAC 24 A, single phase, 50/60 Hz, and an output at 200-240 VAC 24 A, single phase, 50/60 Hz. Automatic switching between the primary input and the secondary input may be based on drop-out of 182 volts, pull-in of 195 volts, based on an input voltage of 208 V.

Power from reserve power system 606 may be transmitted on power bus ring portion 601. Shunt trip breakers 615, 625, 635, 645 are provided for each of rack computer systems 617 coupled to ring portion 601. In some embodiments, overcurrent protection for one or more reserve power systems 606 coupled to one or more reserve power bus ring portions is controlled with controller 612. Controller 612 may receive data from meter 610 coupled one or more systems and components of reserve power side 600. In some embodiments, if the load at a reserve UPS (including, for example, UPS 132 described above with reference to FIG. 1) of one or more reserve power systems coupled to one or more portions of a reserve power bus ring exceeds a first predetermined level, and the one or more reserve power systems trip into static bypass, and if the load at the UPS exceeds a second predetermined level, some rack computer systems are shed by way of shunt trip breakers 615, 625, 635, 645. In some embodiments, in a system including a 750 KW UPS, a reserve power system trips into static bypass if the load at the UPS is over 700 KW, and the lowest priority rack computer systems are shed if the load at the UPS is more than 90% of the rating of the static bypass.

In some embodiments, controller 612 determines whether one or more fault conditions associated with reserve power side 600 are present. Such fault conditions may include a fault in one or more systems and components of reserve power system 606, transformer 602, generator 604, power bus ring portion 601, etc. A fault condition may be determined based upon data associated with power supplied through one or more pathways. For example, in the illustrated embodiment, meter 610 may collect data associated with power provided from reserve power system 606 to ring portion 601 and transmit such data to controller 612. Controller 612 may analyze the collected data to determine whether a fault condition is present in one or more of reserve power system 606, transformer 602, generator 604, etc. For example, controller 612 may determine, based at least in part upon analysis of the collected data, that the power output from reserve power system is out of synchronization with power output from other reserve power systems coupled to one or more portions of the reserve power bus ring and may respond by determining that a fault condition is present in the reserve power system 606. In another example, controller 612 may determine, based at least upon one or more parameters including voltage, current, etc. that an electrical fault is present in reserve power system 606 and may respond by determining that a fault condition is present in the reserve power system 606. In some embodiments, controller 612 may respond to a determination that a fault condition is present with regard to reserve power system 606 by commanding an isolation device 613 to isolate reserve power system 606 from ring portion 601. As discussed above, an isolation device may include a switching device, a fault current limiter device, etc. In some embodiments, isolation device 613 may operate independently of an external controller 612 based at least in part upon internal controller systems, mechanisms, etc.

In some embodiments, controller 612 determines a fault condition with regard to ring portion 601 is present. For example, controller 612 may be coupled to one or more meters (not shown) coupled directly to ring portion 601 that collect data associated with power being carried by ring portion 601. Controller 612 may analyze such collected data and determine, based at least in part on the analysis, that a fault condition is present in ring portion 601. For example, where a portion of a power bus bar comprising ring portion 601 is damaged, such damage may manifest in collected power data as abnormal voltage, current, etc. in the ring portion 601. In addition, faults upstream of at least a portion of the ring portion 601, including a fault in reserve power system 606, may manifest as abnormal voltage, current, etc. in the ring portion 601. Controller 612 may respond to a determination of abnormal power data by determining a fault condition with regard to ring portion 601 and may command one or more of isolation devices 614, 616 to at least partially isolation ring portion 601 from one or more other portions of a reserve power bus ring. In some embodiments, isolation devices 614, 616 operate independently of an external controller 612 based at least in part upon internal controller systems, mechanisms, etc.

Figure 7:
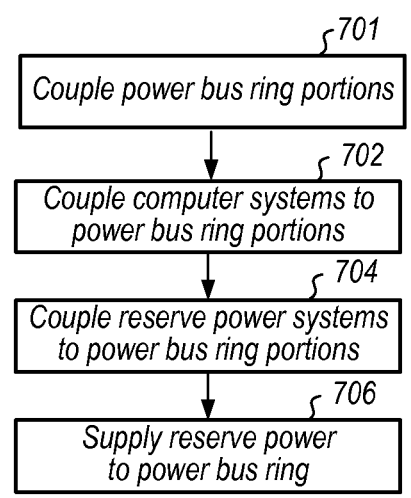
FIG. 7 is a flow diagram illustrating operations of a reserve power bus ring system according to one embodiment.

FIG. 7 is a flow diagram illustrating operations of a reserve power bus ring system according to one embodiment. At 701, one or more power bus portions are coupled to assemble a reserve power bus ring. In some embodiments, a power bug ring is assembled via coupling at least two parallel power bus bars. For example, two parallel bus bars may be coupled at their respective proximate ends to form a continuous power bar ring. In some embodiments, a reserve power bus ring is assembled, at least in part, through coupling two or more power bus bars in series. Two or more power bus bars may be coupled in series with one or more other devices to form a reserve power bus ring portion. For example, an isolation device, which may include one or more switching devices, fault current limiter devices, etc., may be incorporated into a reserve power bus ring through coupling respective input and output connectors of the isolation device to separate power bus bars to form an electrical pathway through the isolation device. In another example, an isolation device may be coupled to a power bus bar to incorporate the isolation device to the reserve power bus ring.

In some embodiments, coupling power bus ring portions includes coupling one or more power bus bars in series with one or more isolation devices to form one or more ring portions and coupling the one or more ring portions in series to form the reserve power bus ring. For example, two or more power bus portions, each comprising one or more power bus bars, may be coupled in series where one or more devices, including one or more isolation devices, selectively close a connection between two or more of the power bus portions.

At 702, one or more sets of computer systems are coupled to a reserve power bus ring. In some embodiments, one or more of a plurality rack computer systems, each comprising one or more sets of computer systems, are each coupled to separate portions of the reserve power bus ring, thereby communicatively coupling the one or more sets of computer systems to the respective separate portions of the reserve power bus ring. In some embodiments, one or more computer systems are coupled to a reserve power bus ring portion through a transfer switch, breaker, etc. which may selectively supply power from the reserve power bus ring portion to the one or more sets of computer systems.

At 704, one or more reserve power systems are coupled to one or more portions of the reserve power bus ring. In some embodiments, at least one separate reserve power system is coupled to each of two or more portions of the reserve power bus ring. In one example, where a reserve power bus ring includes four portions, and each portion has at least one set of computer systems coupled thereto, at least one separate reserve power system may be coupled to each of the portions, for a total of four separate reserve power systems coupled to the reserve power bus ring. In some embodiments, one or more reserve power systems are coupled to two or more portions of the reserve power bus ring to concurrently supply power to both portions, selectively supply power to one or more portions via one or more switching devices, etc.

At 706, reserve power is supplied to the reserve power bus ring. Reserve power, in some embodiments, is supplied by one or more of the reserve power systems coupled to various portions of the reserve power bus ring. Reserve power supplied to the reserve power bus ring may be selectively supplied from one or more portions of the reserve power bus ring to one or more sets of computer systems based at least in part upon one or more switching devices, including one or more automatic transfer switches.

Figure 8:
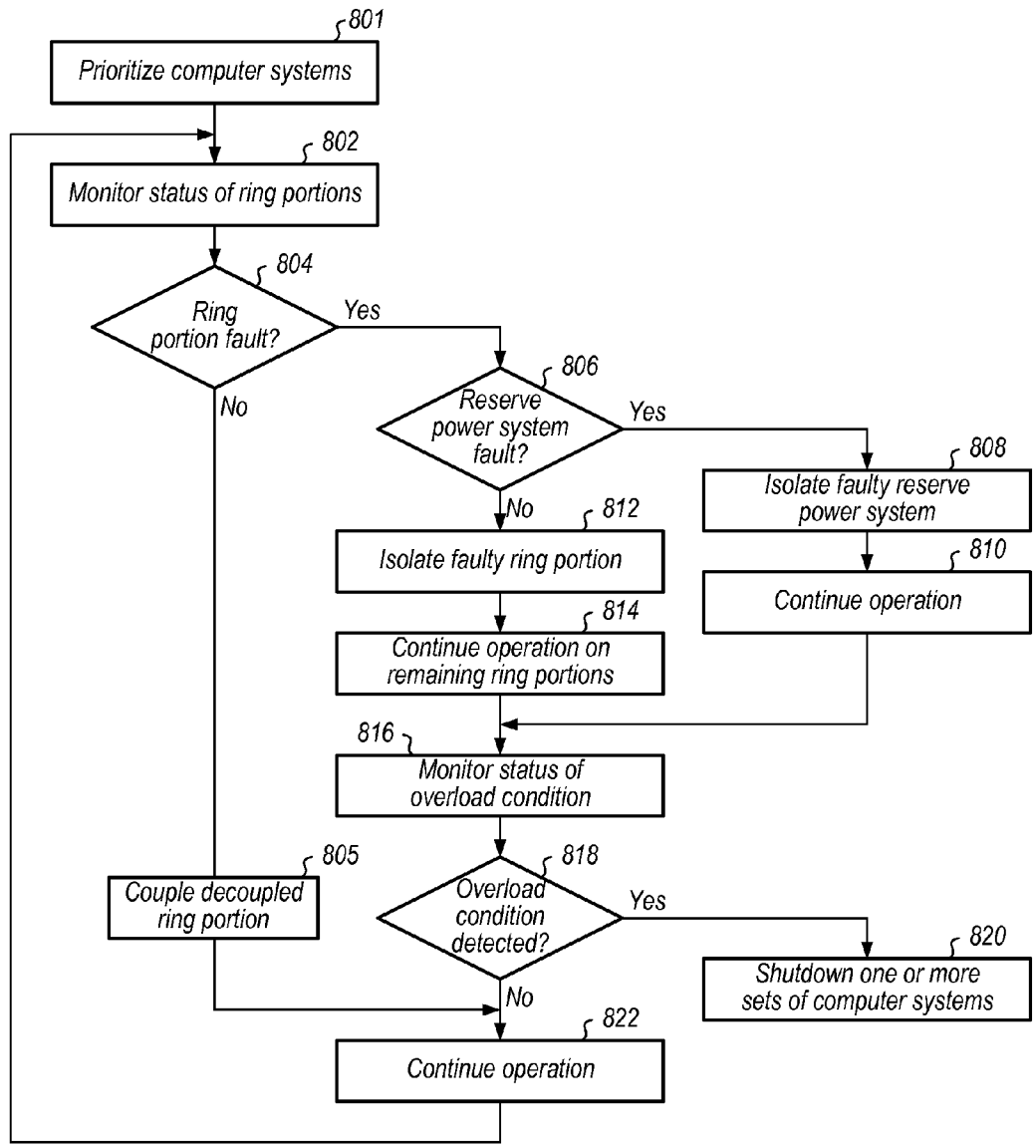
FIG. 8 is a flow diagram illustrating switch control logic for a reserve power bus ring system according to one embodiment.

FIG. 8 is a flow diagram illustrating switch control logic for a reserve power bus ring system according to one embodiment. The logic may be implemented by one or more controllers in a system that includes one or more primary power systems, one or more reserve power systems, and a power ring bus according to some embodiments. The controllers may be implemented, in part or in full, by one or more computer systems, such as described further below.

At 801, one or more sets of computer systems communicatively coupled to a reserve power bus ring are prioritized. At 802, status of at least one condition in the reserve power bus ring, one or more coupled reserve power systems, etc. is monitored for fault conditions. A fault condition may be, for example, a current in a portion of the reserve power bus ring exceeding a predetermined current level, where the predetermined current level is associated with a breaking current capacity of one or more components in the reserve power bus ring, including one or more power bus bars, switches, etc. comprised in the reserve power bus ring.

At 804 and 822, if no fault conditions are detected, reserve power bus ring may remain in full operation. Furthermore, at 805, if a ring portion is isolated from one or more other portions of the reserve power bus ring but no fault conditions are detected, one or more isolation devices are commanded to couple the ring portion to one or more ring portions from which it is isolated. Such a commanding may include commanding one or more switching devices to close a connection between two or more ring portions. If, as shown at 804 and 806, a fault condition is detected with regard to a particular reserve power system coupled to one or more ring portions, one or more isolation devices are commanded, at 808, to at least partially isolate the particular reserve power system from one or more portions of the reserve power bus ring. The reserve power bus ring then continues operation at 810.

If, at 806 and 812, a fault condition is detected with regard to a reserve power bus ring portion, and the fault condition is not associated with a particular reserve power system but is rather associated with a particular power bus ring portion, one or more isolation devices are commanded, at 812, to at least partially isolate the particular ring portion from one or more other portions of the reserve power bus ring. For example, where power data collected from the ring portion indicates abnormal properties of power being carried through the ring portion, a fault condition with regard to the ring portion may be detected and two or more isolation devices may be commanded to isolate the ring portion. At 814, operations are continued on at least the remaining ring portions. For example, where one portion of a reserve power bus ring is isolated from three other power bus ring portions due to detection of a fault condition regarding the one ring portion, the remaining three power bus ring portions may be operated to continue providing reserve power support for various electrical loads coupled to one or more of the remaining ring portions.

At 816, systems and components associated with the reserve power bus ring are monitored for one or more overload conditions. For example, reserve power systems coupled to one or more portions of the reserve power bus ring may be monitored for indications of an overload condition, the one or more reserve power systems tripping into static bypass. If, at 822, no overload conditions are detected, normal operations regarding the reserve power bus ring continue. If, at 820, an overload condition is detected with regard to one or more reserve power systems, one or more computer systems coupled to one or more portions of the reserve power bus ring are shut down. For example, one or more shunt trip breakers may be controlled to shed computer systems from the reserve power bus ring in order of reverse priority (lowest-priority computer system is shed first).

Figure 9:
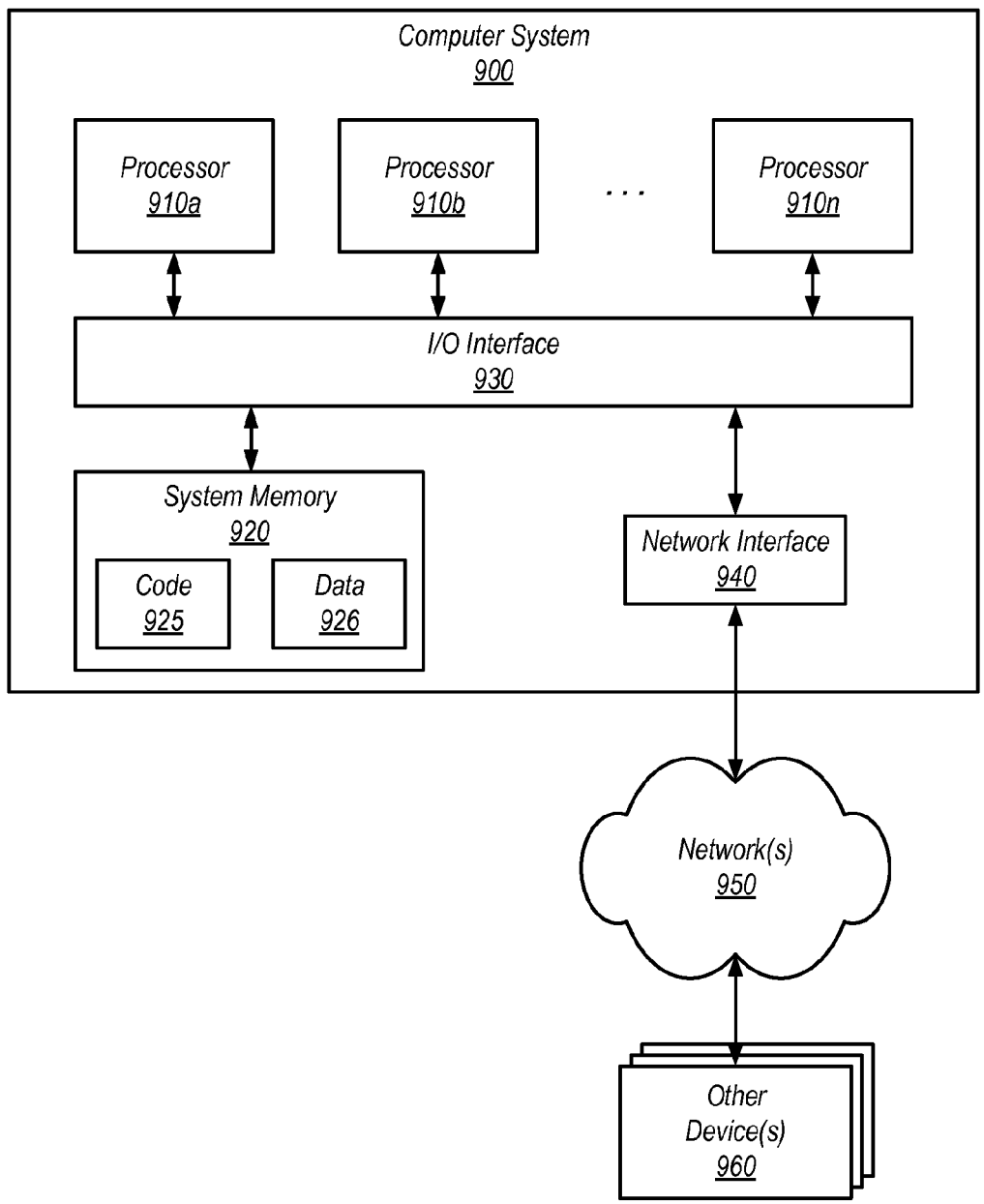
FIG. 9 is a block diagram illustrating an example computer system that may be used in some embodiments.

FIG. 9 is a block diagram illustrating an example computer system that may be used in some embodiments.

In some embodiments, a system that implements a portion or all of one or more of the technologies, including but not limited to a portion or all of the reserve power bus ring, systems and components associated with the reserve power bus ring, and various methods, systems, components, devices, and apparatuses as described herein, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, including but not limited to a portion or all of the reserve power bus ring, systems and components associated with the reserve power bus ring, and various methods, systems, components, devices, and apparatuses as described herein, are shown stored within system memory 920 as code 925 and data 926.

In one embodiment, I/O interface 730 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 through 6, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data for implementing embodiments of methods as described above relative to FIGS. 1-6. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for supplying power, comprising:
two or more sets of computer systems;
one or more primary power systems coupled to, and configured to provide primary power support to at least one of the two or more sets of computer systems;
two or more reserve power systems configured to provide reserve power support to the two or more sets of computer systems, wherein total power requirements of the two or more sets of computer systems exceed respective capacities of each individual reserve power system to supply power; and
a reserve power bus ring communicatively coupling the two or more reserve power systems and each of the two or more sets of computer systems, wherein the one or more primary power systems are coupled to the at least one of the two or more sets of computer systems separately from the reserve power bus ring and the two or more reserve power systems, wherein the reserve power bus ring comprises at least two switching devices configured to collectively isolate a particular portion of the reserve power bus ring, to which at least one set of computer systems and at least one reserve power system are coupled, from a remainder portion of the reserve power bus ring to which one or more other sets of computer systems and at least one other reserve power system are coupled,
wherein the at least two switching devices are configured to collectively isolate the particular portion of the reserve power bus ring in response to detection of a fault condition in the particular portion of the reserve power bus ring, such that each of the one or more other sets of computer systems continue to receive reserve power support from the at least one other reserve power system via the remainder portion of the reserve power bus ring.

2. The system of claim 1, wherein, to isolate the particular portion of the reserve power bus ring in response to detection of a fault condition in the particular portion, the at least two switching devices are collectively configured to isolate the particular portion of the reserve power bus ring in response to at least one of:
a determination that current in the particular portion of the reserve power bus ring exceeds a predetermined threshold, or
a determination that power supplied by the at least one reserve power system coupled to the particular portion is destabilized.

3. The system of claim 1, wherein:
the reserve power bus ring is configured to enable at least two of the reserve power systems to concurrently provide reserve power support to at least one of the sets of computer systems, such that the at least one set of computer systems continues to receive reserve power support from at least one of the at least two reserve power systems if reserve power support from the other of the at least two reserve power systems is lost.

4. The system of claim 1, wherein the reserve power bus ring comprises:
an upstream power bus bar connecting each of at least two reserve power systems on an upstream portion of each reserve power system;
a downstream power bus bar connecting each of the at least two reserve power systems on a downstream portion of each reserve power system, wherein the downstream power bus bar operates at a lower voltage than the upstream power bus bar; and
an electrical pathway of each of the at least two reserve power systems that comprises a transformer and communicatively couples the upstream bus bar to the downstream bus bar via a portion of the respective reserve power system.

5. A system for providing reserve power, the system comprising:
a reserve power bus ring communicatively coupling each of two or more sets of computer systems to each of at least two reserve power systems, wherein each set of computer systems receives independent primary power support from separate primary power systems, wherein the reserve power bus ring is configured to supply reserve power from each of the reserve power systems to each of the sets of computer systems, the reserve power bus ring comprising:
at least two power bus bars oriented alongside each other and coupled in series, and
at least two normally-closed isolation devices located on at least one of the at least two power bus bars, wherein the at least two isolation devices segment the reserve power bus ring into at least two portions, wherein each of the reserve power systems is coupled to a separate portion of the reserve power bus ring, wherein the isolation devices are configured to collectively isolate a particular portion of the reserve power bus ring from a remaining portion of the reserve power bus ring in response to detection of a fault condition regarding the particular portion.

6. The system of claim 5, wherein each of the isolation devices comprise at least one normally-closed switching device configured to open to break at least one electrical connection between the particular portion and the remaining portion of the reserve power bus ring, to at least partially isolate the particular portion from the remaining portion, in response to detection of a fault condition regarding the particular portion.

7. The system of claim 6, wherein the fault condition comprises abnormal current in the particular portion of the reserve power bus ring.

8. The system of claim 5, wherein at least one of the isolation devices comprises at least one normally-closed switching device configured to open to break an electrical connection between the particular portion and at least one reserve power system to isolate the at least one reserve power system from the reserve power bus ring.

9. The system of claim 5, wherein the reserve power bus ring comprises:
   an upstream power bus bar connecting each of at least two reserve power systems on an upstream portion of each reserve power system;
   a downstream power bus bar connecting each of the at least two reserve power systems on a downstream portion of each reserve power system, wherein the downstream power bus bar operates at a lower voltage than the upstream power bus bar; and
   an electrical pathway of each of the at least two reserve power systems that comprises a transformer and communicatively couples the upstream bus bar to the downstream bus bar via a portion of each of the at least two reserve power systems.

10. The system of claim 9, wherein the at least two isolation devices are configured to collectively break an electrical connection on each of the power bus bars to isolate the at least two reserve power systems from each other, in response to a determination that respective power sources for each of the at least two reserve power systems are unsynchronized.

11. The system of claim 9, wherein at least one of the at least two isolation devices comprises a switching device configured to isolate a power source of at least one of the reserve power systems, in response to a determination that the power source is unsynchronized with a power source of another one of the two reserve power systems, such that the at least one of the reserve power systems receives power from the another power source via the upstream power bus bar.

12. The system of claim 9, wherein:
   the downstream bus bar comprises two bus bar portions coupled together by at least one isolation device, wherein each bus bar portion is coupled to at least one computer system and a separate one of the two reserve power systems; and
   the at least one isolation device is configured to isolate the two bus bar portions from each other, such that a computer system coupled to a particular bus bar portion continues to receive reserve power support from a reserve power system coupled to the particular bus bar portion and is isolated from another reserve power system coupled to another bus bar portion.

13. The system of claim 5, wherein the reserve power bus ring comprises one or more shut-down devices configured to automatically shut down at least one of the sets of computer systems if a total power requirement of computer systems actively drawing power from the reserve power bus ring exceeds a total capacity of reserve power systems communicatively coupled to the computer systems via a portion of the reserve power bus ring to supply power.

14. The system of claim 13, wherein:
   the one or more shut-down devices are configured to prioritize at least one of the computer systems or at least one of the sets of computer systems, and
   the one or more shut-down devices are configured to shut-down at least one low priority computer system while continuing to supply reserve power to at least one other computer system if a total power requirement of computer systems actively drawing power from the reserve power bus ring exceeds a total capacity of reserve power systems communicatively coupled to the computer systems via a portion of the reserve power bus ring to supply power.

15. The system of claim 5, wherein:
   total power requirements of one or more sets of computer systems coupled to the remaining portion of the reserve power bus ring exceed an individual capacity of each individual reserve power system coupled to the remaining portion to supply power; and
   the total power requirements of the one or more sets of computer systems coupled to the remaining portion of the reserve power bus ring are met by a collective capacity of a plurality of the reserve power systems coupled to the particular portion and the remaining portion to concurrently supply power.

16. A method comprising:
   monitoring a plurality of portions of a reserve power bus ring for one or more fault conditions, wherein each portion of the reserve power bus ring is coupled to at least one set of computer systems and at least one reserve power system, wherein each set of computer systems is coupled to a respective separate primary power system and receives independent primary power support from the respective separate primary power system, and the reserve power bus ring portions are configured to route power from each of the reserve power systems to each set of computer systems; and
   in response to detection of a fault condition associated with a particular portion of the reserve power bus ring, automatically selectively triggering at least two isolation devices to isolate the particular portion from a remainder of portions of the reserve power bus ring, such that each set of computer systems coupled to one of the remaining portions continues to receive reserve power support from each reserve power system coupled to at least one of the remaining portions.

17. The method of claim 16, wherein detection of the fault condition associated with the particular portion of the reserve power bus ring comprises detection of a current in the particular portion that exceeds at least one predetermined threshold.

18. The method of claim 16, comprising:
   in response to detection of the fault condition associated with a particular reserve power system coupled to the particular portion of the reserve power bus ring, automatically selectively triggering at least one isolation device to isolate the particular reserve power system from the particular portion of the reserve power bus ring, such that each set of computer systems coupled to the particular portion continues to receive reserve power support from each reserve power system coupled to at least one of the remaining portions.

19. The method of claim 16, wherein detection of the fault condition associated with a particular portion of the reserve power bus ring comprises a determination that a power source to a reserve power system coupled to the particular portion is unsynchronized with another power source to another reserve power system coupled to one of the remaining portions.

20. The method of claim 19, comprising:
   in response to the determination that the power source to a particular reserve power system coupled to the particular portion is unsynchronized with another power source to another reserve power system coupled to one of the remaining portions, triggering at least one isolation device to isolate the particular portion from the remaining portions, such that computer systems coupled to the particular portion continue to receive reserve power support from at least the particular reserve power system and computer systems coupled to the remaining portions continue to receive reserve power support from at least the other reserve power system.

* * * * *